United States Patent
Wobben

(10) Patent No.: US 7,199,485 B2
(45) Date of Patent: Apr. 3, 2007

(54) WIND TURBINE WITH CURRENT CONDUCTING MEANS, WHICH ARE PRE-ASSEMBLED IN THE TOWER

(76) Inventor: Aloys Wobben, Argestrasse 19, Aurich (DE) 26607

( * ) Notice: Subject to any disclaimer, the term of this patent is extended or adjusted under 35 U.S.C. 154(b) by 24 days.

(21) Appl. No.: 10/493,192

(22) PCT Filed: Aug. 31, 2002

(86) PCT No.: PCT/EP02/09747

§ 371 (c)(1),
(2), (4) Date: Oct. 6, 2004

(87) PCT Pub. No.: WO03/036084

PCT Pub. Date: May 1, 2003

(65) Prior Publication Data

US 2005/0042099 A1    Feb. 24, 2005

(30) Foreign Application Priority Data

Oct. 24, 2001    (DE) ................................ 101 52 557

(51) Int. Cl.
*F03D 9/00* (2006.01)
*H02P 9/04* (2006.01)

(52) U.S. Cl. ......................................... 290/55; 290/44
(58) Field of Classification Search ................ 290/44, 290/55; 415/7, 2.1, 4.2, 907, 4.5; 416/7
See application file for complete search history.

(56) References Cited

U.S. PATENT DOCUMENTS

| | | | | |
|---|---|---|---|---|
| 2,106,557 | A | * | 1/1938 | Putnam ........................ 290/44 |
| 3,768,016 | A | * | 10/1973 | Townsend et al. ............ 455/25 |
| 4,134,707 | A | * | 1/1979 | Ewers ........................ 415/4.2 |
| 4,291,233 | A | * | 9/1981 | Kirschbaum ................ 290/1 C |
| 4,488,696 | A | | 12/1984 | Sauber ...................... 248/74.1 |
| 4,813,193 | A | * | 3/1989 | Altizer ........................ 52/210 |
| 5,063,473 | A | * | 11/1991 | Hall et al. ................. 361/93.1 |
| 5,254,876 | A | * | 10/1993 | Hickey ........................ 290/55 |
| 6,157,088 | A | * | 12/2000 | Bendix ........................ 290/55 |
| 6,457,281 | B1 | * | 10/2002 | Teron ........................ 52/79.14 |

(Continued)

FOREIGN PATENT DOCUMENTS

DE    44 36 197 A1    4/1996

(Continued)

OTHER PUBLICATIONS

"Erstmusterprüfung bei der KGW Schwerin," *Wind-Kraft & Natürliche Energien Journal*, Mar. 2001.

*Primary Examiner*—Julio Gonzalez
(74) *Attorney, Agent, or Firm*—Seed IP Law Group PLLC

(57) ABSTRACT

The present invention concerns a wind energy plant for generation of alternating current with a tower constructed of several tower segments, a generator arranged in the region of the top of the tower, a power module arranged in the region of the base of the tower, and current carrying means for transferred current from the generator to the power module. In order to enable faster, easier and thereby cheaper erection of the wind energy plant, it is provided in accordance with the present invention that the current carrying means be premounted in the tower segments in segmented form.

14 Claims, 2 Drawing Sheets

U.S. PATENT DOCUMENTS

| | | | |
|---|---|---|---|
| 6,467,233 B1* | 10/2002 | Maliszewski et al. | 52/720.1 |
| 6,713,891 B2* | 3/2004 | Kirkegaard et al. | 290/44 |
| 2004/0131467 A1* | 7/2004 | Wobben | 416/132 B |
| 2005/0129504 A1* | 6/2005 | De Roest | 415/4.2 |
| 2005/0286996 A1* | 12/2005 | Tsai | 415/4.2 |
| 2006/0233645 A1* | 10/2006 | Wobben | 416/132 B |

FOREIGN PATENT DOCUMENTS

| | | |
|---|---|---|
| DE | 0 959 546 A1 | 11/1999 |
| DE | 198 32 921 A1 | 2/2000 |
| EP | 1 036 937 A2 | 9/2000 |
| GB | 1 432 566 | 4/1976 |
| GB | 2 224 294 A | 5/1990 |
| WO | WO 00/36724 | 6/2000 |
| WO | WO 01/77527 A1 | 10/2001 |

* cited by examiner

WIND TURBINE WITH CURRENT CONDUCTING MEANS, WHICH ARE PRE-ASSEMBLED IN THE TOWER

FIELD OF THE INVENTION

The present invention concerns a wind energy plant with a tower formed of a number of tower segments, with a generator arranged in the region of the tower head, with a power module arranged in the region of the tower base and with current carrying means to transfer the current from the generator to the power module.

BACKGROUND OF THE INVENTION

The electrical power module of a wind energy plant, which includes electrical units such as transformers, control boxes, optionally rectifiers, medium voltage plants, low voltage distributors, etc., is arranged underneath the level of the generator as in the case of the known wind energy plants and commonly is in the region of the base of the tower of the wind energy plant. Most often a separate small building outside the wind energy plant is provided for this module or for some of these components. Current carrying means, which most often run within the tower and are designed as cables, are provided to carry the electrical energy produced by a generator arranged in a gondola at the top of the tower to the power module. These cables are introduced into the tower after it has been built. This is a costly process, since the cable has to be installed over the entire height of the tower in a separate work cycle. In addition, this work cycle is dependent on the prior erection of the tower.

BRIEF SUMMARY OF THE INVENTION

This invention is based on providing a wind energy plant that can be erected more easily and thus also cheaper and faster.

In accordance with the present invention, current carrying means are premounted in segmented form in the tower segments.

The segments of the current carrying means are thus premade and are preferably installed on the tower segments before the tower is constructed from the individual tower segments. It is thus no longer necessary to perform the laborious operation of pulling cable through the tower after the tower has been built in order to connect the generator and power module to each other electrically. Through the measures in accordance with the present invention, the entire construction time of the wind energy plant can be reduced and the costs for construction reduced without a tradeoff of any kind of technical disadvantage.

Advantageous embodiments of the wind energy plant in accordance with the present invention are claimed in the dependent claims. It is preferable for the segments of the current carrying means to be firmly attached to the pertinent tower segment only in one region, preferably in the region that is uppermost in the erected state. This attachment to the power segment preferably take place before the erection of the tower, so that the tower segments, including the segments of the current conducting means attached to them, are premade. Since the segment of the current conducting means is firmly attached to the tower at only one point, it is indeed attached, but it is movable within certain limits at the inside wall of the tower segment and thus can still be adjusted in order to connect it as easily and reliably as possible to the next segment of the current conducting means of the next tower segment.

For further attachment of the segments of the current conducting means within the tower segment, one can in any case also provide additional fastening elements on the inside wall of the tower, with which the segments of the current carrying means are firmly held before or after erection of the tower in order to affix said means as well as possible.

If the current conducting means are designed as a cable, the lengths of the cable sections in the tower segments can, in order to bridge over flanges or parts that protect from the inside wall of the tower, be measured so that bridging these regions is possible without any problem.

If current buses are used as current carrying means, flexible connecting buses can preferably be provided in order to bridge over parts that project from the inside wall of the tower and/or to connect current bus segments. These flexible buses are used after erection of the tower to connect the current bus segments, if such segments do not meet each other directly or if gaps or other hindrances between the current bus segments, for example a flange on the tower bus segment, have to be bridged.

In order to protect maintenance personnel against contact with the current buses as they climb the tower through its internal space and to ensure electrical insulation on the one hand and to protect the current carrying means against damage on the other, a protective sheathing, in particular a guard plate, which is firmly attached to the inside wall of the tower and which completely protects the current carrying means against contact is provided in another embodiment. This protective sheathing can also be divided into individual segments, which are likewise premounted on the tower segments, like the segments of the current carrying means. A further reduction of time and simplification of erection of the wind energy plant is achieved through this.

BRIEF DESCRIPTION OF THE SEVERAL VIEWS OF THE DRAWINGS

The present invention is illustrated in more detail before by means of the drawings.

DETAILED DESCRIPTION OF THE INVENTION

Figure 1:
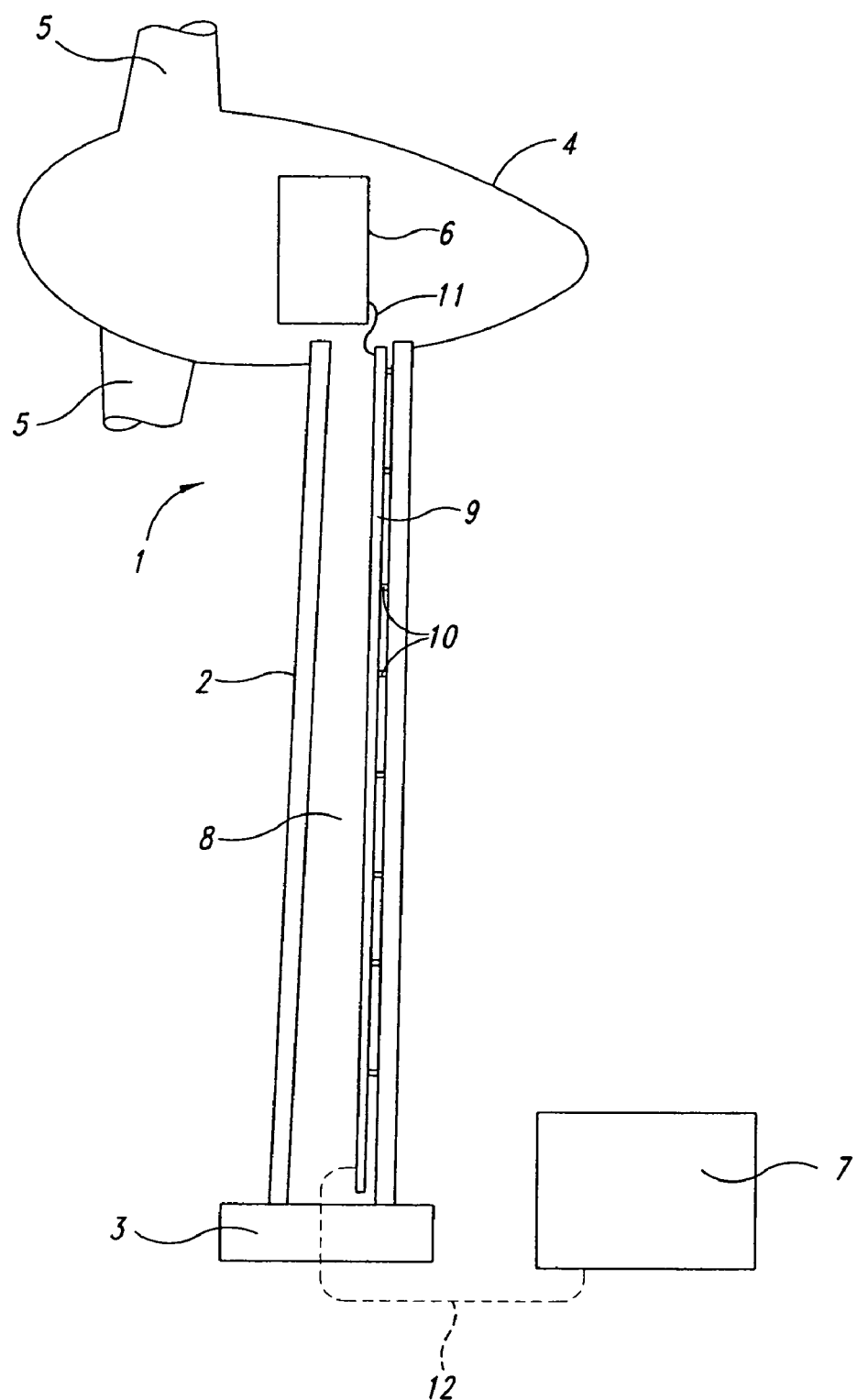
FIG. 1 shows a wind energy plant in accordance with the present invention.

The wind energy plant 1 in accordance with the present invention that is shown schematically in FIG. 1 has a tower 2 with foundation 3, a gondola 4 that is positioned with the possibility of rotation in the region of the top of the tower and a power module 7 arranged in the region of the base of the tower, for example in a separate housing. A rotor with several rotor blades 5, which can rotate about a horizontal axis, and an electrical generator 6 are arranged within the gondola 4. Wind forces acting on the rotor blades 5 set the rotor in motion and drive generator 6 to produce electrical energy.

To transfer the energy produced by generator 6 to the power module 7, which has numerous electrical units, such as a transformer or optionally a rectifier for processing the electrical current, before it is sent to the power network or to a user, there are provided current buses, preferably two current buses, in the inside space 8 of tower 2 at the wall by means of fastening elements 10. These buses are electrically conducting and are electrically connected via a cable 11 to the generator and via a connecting line 12, which preferably goes through the foundation 3 and underground to power module 7.

Figure 2:
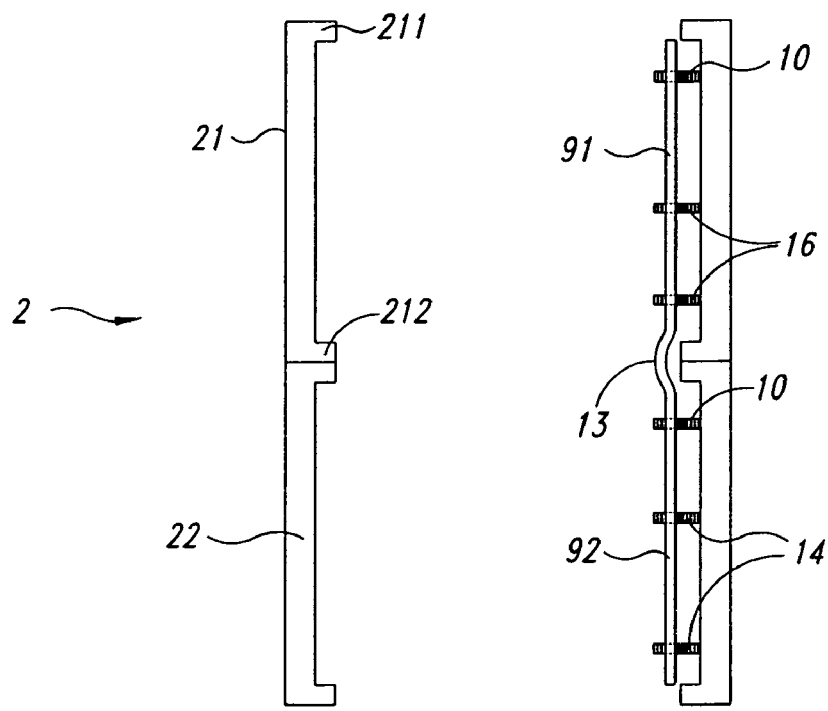
FIG. 2 shows a section through such a wind energy plant with two tower segments and FIG. 3 shows a perspective drawing of current buses provided in accordance with the present invention.

The current buses 9 are made rigid and preferably consist of individual current bus segments, as, for example, is shown in more detail in FIG. 2. Two tower segments 21 and 22, of which the tower 2 is preferably constructed, are shown there. Such tower segments 21 and 22 can consist, for example, of steel or even of concrete.

These tower segments 21 and 22 are premade and are assembled into the tower at the site of the wind energy plant. In order to reduce the setup time even further and to simply the work and thus reduce the costs of the overall wind energy plant, the current bus segments 91 and 92 are preferably firmly attached to the appropriate sites of the individual tower segments 21 and 22 before the erection of tower 2. Preferably, the attachment of the current bus segments 91 and 92 takes place only in the upper region of the relevant tower segment 21 and 22 by means of a fastening element 10, while the remaining part of the current bus segments 91 and 92 remains movable to a certain extent, in order to simply the connection with the subsequent bus segments. Through this construction relative movement between the tower 2 and current buses 91 and 92, for example as a consequence of different coefficients of expansion, can also be compensated. However, it can also be provided for the use of other fastening elements 14 that guide the current bus segments 91 and 92 over the entire length. For this the cross-section of the opening for current bus segments 91 and 92 in the fastening elements 14 can be designed to be greater than the cross-section of the current bus segments 91 and 92 itself. Relative movement of the current bus segments 91 and 92 in fastening elements 14 is enabled in this way and at the same time the current buses 91 and 92 are guided and restricted in their ability to move.

In order to connect the current bus segments 91 and 92 and in doing so to bridge parts that may be present projecting into the inside space, such as flanges 211 and 212 that are present at the lower and upper edge of the tower segments 21 and 22, insulated flexible connecting buses 13 are used, the shape of which can be changed by hand as they are attached to the two current bus segments 91 and 92. Also, material expansions or contractions, for example due to temperature variations, can be compensated for by these connecting buses 13.

Figure 3:
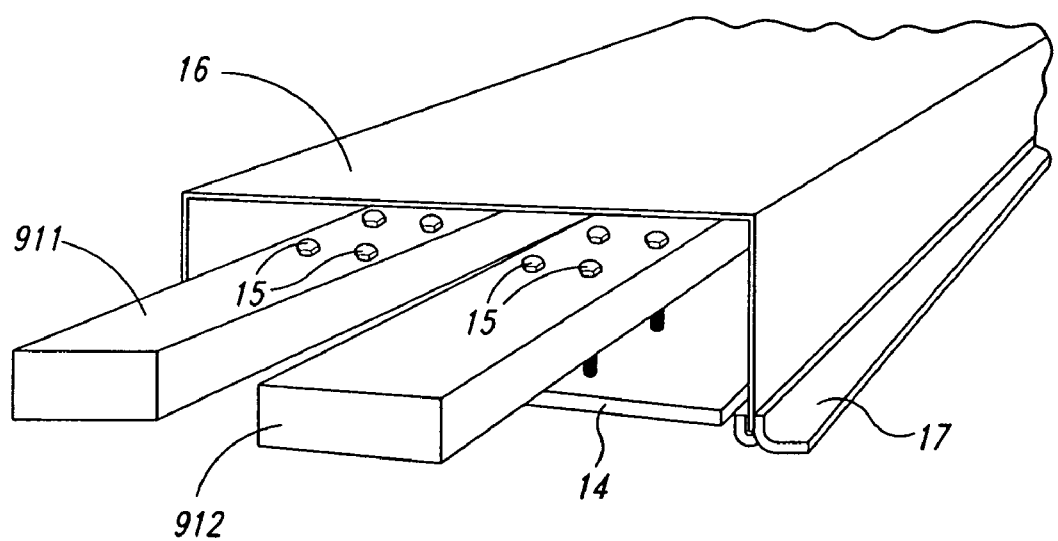

FIG. 3 shows a perspective drawing of two parallel current bus segments 911 and 912. These are firmly screwed to the fastening elements 14 by screws 15. In this case insulating means can be provided in order to insulate the current bus segments 911 and 912 from the fastening elements 14. Alternatively, of course, the fastening elements 14 themselves can also be made of an insulating material. The fastening elements 14 themselves are firmly screwed to the inside wall of the tower segment.

For protection against contact with current buses 911 and 912 in the operation of the wind energy plant, there is additionally provided a guard plate 16, which, just like the current bus segments 911 and 912, can already be built into the individual tower segments before the erection of the tower 2. By means of a guide rail 17 which can consist, for example, of solid rubber, this protective sheathing can, on the one hand, be secured and, on the other hand, be insulated from the tower segment. However, still other means that are not shown here can also be provided to fasten the guard plate 16.

Furthermore, in and/or on these guard plates that are provided as protective sheathing 16, it is also possible to position other devices, such as electrical receptacles, lights, etc., so that these can likewise be preassembled in a simple way. In addition, the incorporation of these devices into the protective sheathing 16 in particular avoids exposed installation on the inside wall of the tower and thus leads to reduced danger of damage, for example by falling objects during and after the erection of the tower.

For the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind energy plant, comprising:
a tower formed of several tower segments,
a generator arranged in a region of a top of the tower, and
current carrying means for conducting generated current from the top of the tower, the current carrying means being premounted in segmented form in the tower segments before the tower is assembled, wherein adjacent segments of said current carrying means in segmented form are electrically connected to each other when the tower is assembled.

2. The wind energy plant according to claim 1 wherein the current carrying means are fastened to the tower segments with fastening elements.

3. The wind energy plant according to claim 1 wherein the current carrying means are protected against contact by a cover, including a cover plate.

4. The wind energy plant according to claim 1 wherein segments of the current carrying means are firmly connected to a relevant tower segment only in one region, including a region that is uppermost in an erected state.

5. The wind energy plant according to claim 1 wherein the current carrying means are built as cable.

6. The wind energy plant according to claim 1 wherein the current carrying means are built as buses.

7. The wind energy plant according to claim 6, further comprising flexible connecting buses to bridge over parts that project from an inside wall of the tower and/or to connect segments of current buses.

8. The wind energy plant according to claim 1, further comprising a power module where current carrying means to carry the current from the generator to the power module are provided.

9. The wind energy plant according to claim 8 wherein the power module is arranged in a region of a base of the tower.

10. The tower segment for a tower of a wind energy plant formed from several tower segments, which has a generator to generate current in a region of a top of the tower, the tower segment comprising:
a current carrying cable segment to conduct the generated current from the top of the tower, the current carrying cable segment being preinstalled in the tower segment before the tower is assembled,
wherein said several tower segments are adapted to be stacked on top of each other to form the tower, and
wherein said current carrying segment is preinstalled at a location in said tower segment to facilitate electrical connection of said current carrying cable segment to another current carrying segment in an adjacent tower segment, in a manner to permit formation of a single complete electric cable that includes said electrically connected current carrying cable segments when the tower segments are stacked on top of each other to form the tower.

11. A wind energy plant, comprising:

a plurality of individual tower segments, each of the tower segments having a current carrying electrical cable positioned therein prior to being assembled as a tower, the tower segments being adapted to be stacked on top of each other to form a tower for a wind energy plant; and a generator arranged in a region of a top of the tower, the current carrying electrical cable in each segment being premounted at a selected location that provides case of electrical connection of the respective electrical cable in each tower segment to the electrical cable in an adjacent tower segment current to permit forming a single complete electric cable when the tower segments are stacked on top of each other to form the tower.

12. The wind energy plant of claim 11, further comprising a power module positioned in a region of the base of the tower.

13. The wind energy plant of claim 1 wherein said several tower segments are adapted to be stacked on top of each other to form the tower, and wherein said adjacent segments of said current carrying means are electrically connected to each other in a manner to facilitate complete formation of said current carrying means when the tower segments are stacked on top of each other to form the tower.

14. The wind energy plant of claim 13 wherein said adjacent segments of said current carrying means are premounted at a selected location in each respective tower segment so as to facilitate said electrical connection when the tower segments are assembled to form the tower.

* * * * *

UNITED STATES PATENT AND TRADEMARK OFFICE
CERTIFICATE OF CORRECTION

PATENT NO. : 7,199,485 B2
APPLICATION NO. : 10/493192
DATED : April 3, 2007
INVENTOR(S) : Aloys Wobben Page 1 of 1

It is certified that error appears in the above-identified patent and that said Letters Patent is hereby corrected as shown below:

Column 4
Line 62, "carrying segment" should read as --carrying cable segment--.

Column 5
Line 13, "case" should read as --ease--.

Signed and Sealed this

Nineteenth Day of August, 2008

JON W. DUDAS
*Director of the United States Patent and Trademark Office*